(12) United States Patent
Laine et al.

(10) Patent No.: US 8,698,836 B2
(45) Date of Patent: Apr. 15, 2014

(54) SYSTEM, METHOD, AND COMPUTER PROGRAM PRODUCT FOR OPTIMIZING STRATIFIED SAMPLING ASSOCIATED WITH STOCHASTIC TRANSPARENCY

(75) Inventors: Samuli Laine, Vantaa (FI); Tero Karras, Helsinki (FI)

(73) Assignee: NVIDIA Corporation, Santa Clara, CA (US)

( * ) Notice: Subject to any disclaimer, the term of this patent is extended or adjusted under 35 U.S.C. 154(b) by 243 days.

(21) Appl. No.: 13/157,252

(22) Filed: Jun. 9, 2011

(65) Prior Publication Data

US 2012/0313961 A1    Dec. 13, 2012

(51) Int. Cl.
*G09G 5/02*    (2006.01)

(52) U.S. Cl.
USPC ........................................... 345/592

(58) Field of Classification Search
USPC ........................................... 345/592
See application file for complete search history.

(56) References Cited

U.S. PATENT DOCUMENTS

| | | | | |
|---|---|---|---|---|
| 5,459,798 A | * | 10/1995 | Bailey et al. | 382/218 |
| 6,184,891 B1 | * | 2/2001 | Blinn | 345/426 |
| 6,956,576 B1 | * | 10/2005 | Deering et al. | 345/475 |
| 6,982,710 B2 | * | 1/2006 | Salomie | 345/420 |
| 2003/0038811 A1 | * | 2/2003 | Gritz et al. | 345/581 |
| 2012/0213450 A1 | | 8/2012 | Shirley et al. | |

OTHER PUBLICATIONS

"Enderton", "Stochastic Transparency," Proceedings of Interactive 3D Graphics and Games, 2010, pp. 157-164.*
Enderton, E. et al., "Stochastic Transparency," Proceedings of Interactive 3D Graphics and Games, 2010, pp. 157-164.
Mulder et al., "Pixel Masks for Screen-Door Transparency," Proceedings of the Conference on Visualization '98, 1998, pp. 351-358.
Kollig, T. et al., "Efficient Multidimensional Sampling," Computer Graphics Forum, 2002, vol. 21, No. 3, pp. 557-563.
Combined Search and Examination Report from United Kingdom Patent Application No. GB1208781.3, dated Sep. 17, 2012.
Mulvey, J. M. et al., "Stratified Filtered Sampling in Stochastic Optimization," Journal of Applied Mathematics and Decision Sciences, Jun. 2000, pp. 17-38.

* cited by examiner

*Primary Examiner* — Tize Ma
*Assistant Examiner* — Steven Elbinger
(74) *Attorney, Agent, or Firm* — Zilka-Kotab, PC

(57) ABSTRACT

A system, method, and computer program product are provided for optimizing stratified sampling associated with stochastic transparency. In use, surface data associated with one or more surfaces to be rendered is received. Additionally, the one or more surfaces are rendered, utilizing stochastic transparency, where stratified sampling associated with the stochastic transparency is optimized.

18 Claims, 7 Drawing Sheets

SYSTEM, METHOD, AND COMPUTER PROGRAM PRODUCT FOR OPTIMIZING STRATIFIED SAMPLING ASSOCIATED WITH STOCHASTIC TRANSPARENCY

FIELD OF THE INVENTION

The present invention relates to rendering images, and more particularly to rendering transparent and semi-transparent surfaces.

BACKGROUND

Traditionally, surface rendering has enabled the display of one or more surfaces to a user. For example, one or more surfaces of one or more objects may be displayed to a user, utilizing a display. However, current techniques for rendering transparent and semi-transparent surfaces have been associated with various limitations.

For example, current methods for stochastically rendering transparent and semi-transparent surfaces only consider a current primitive while choosing samples during rendering. This may result in inferior spatial stratification, problems at primitive edges, excessive errors/noise, etc.

There is thus a need for addressing these and/or other issues associated with the prior art.

SUMMARY

A system, method, and computer program product are provided for optimizing stratified sampling associated with stochastic transparency. In use, surface data associated with one or more surfaces to be rendered is received. Additionally, the one or more surfaces are rendered, utilizing stochastic transparency, where stratified sampling associated with the stochastic transparency is optimized.

DETAILED DESCRIPTION

Figure 1:
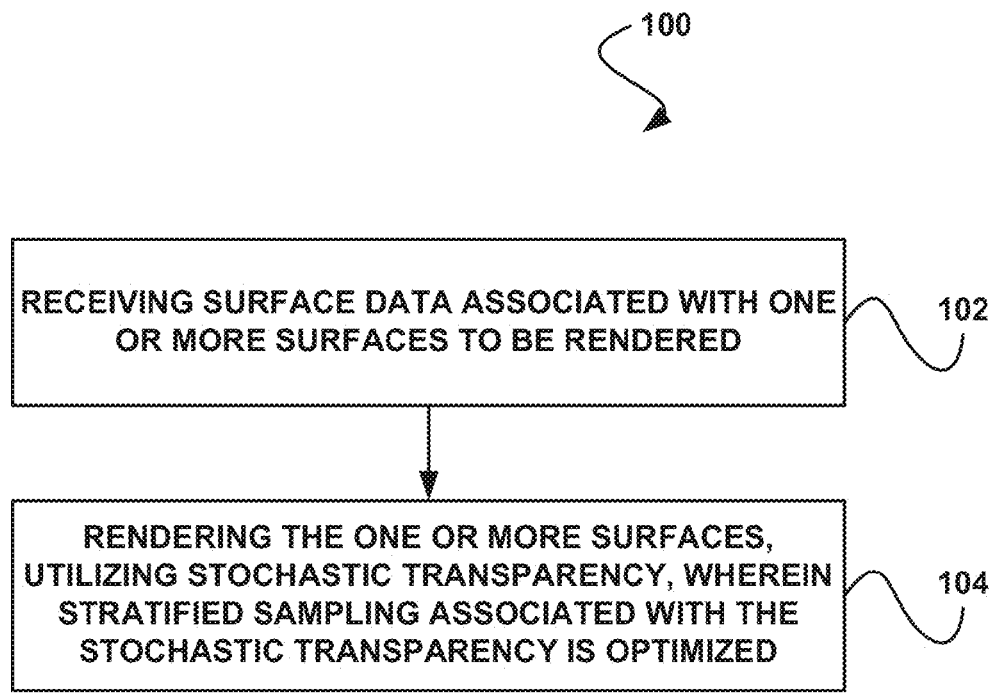
FIG. 1 shows a method for optimizing stratified sampling associated with stochastic transparency, in accordance with one embodiment.

FIG. 1 shows a method 100 for optimizing stratified sampling associated with stochastic transparency, in accordance with one embodiment. As shown in operation 102, surface data associated with one or more surfaces to be rendered is received. In one embodiment, the surface data may include any data associated with one or more surfaces to be rendered. For example, the surface data may include an opacity of one or more surfaces at a particular location (e.g., at a particular pixel, etc.), a color of one or more surfaces at a particular location, etc.

Additionally, in another embodiment, one or more of the surfaces to be rendered may have a level of transparency. For example, one or more of the surfaces to be rendered may be transparent, may be semi-transparent, etc. In another embodiment, one or more of the surfaces to be rendered may be opaque.

Additionally, as shown in operation 104, the one or more surfaces are rendered, utilizing stochastic transparency, where stratified sampling associated with the stochastic transparency is optimized. In one embodiment, stochastic transparency may be utilized to render the one or more surfaces by randomly drawing one of the surfaces into a sample of a pixel to be rendered depending on the opacity of the surface.

Further, in one embodiment, stochastic transparency may be utilized to render the one or more surfaces by first performing a depth test on every covered sample of a pixel to be rendered. In another embodiment, each covered sample of the pixel may be assigned an opacity reference value. In still another embodiment, each covered sample may be conditionally written to a frame buffer and depth buffer, based on a comparison of the opacity of each covered sample to the opacity reference value.

In yet another embodiment, the stratified sampling associated with the stochastic transparency may include any sampling used by the stochastic transparency, where such sampling is stratified. In this way, stratifying sampling may bound an amount of sampling error in simple situations, and may yield improved sampling in complex situations. Also, in one embodiment, the stratified sampling, as well as the stochastic transparency, may be performed utilizing hardware, software, a combination of hardware and software, etc.

Further still, in one embodiment, the stratified sampling associated with the stochastic transparency may be optimized by tracking the one or more surfaces to be rendered. For example, the one or more surfaces to be rendered may be tracked in order to detect when a new surface is started. Additionally, opacity reference values may be reassigned when the new surface is detected. In another embodiment, the tracking may be performed heuristically. In this way, the introduction of correlation of samples from different surfaces is avoided.

Also, in one embodiment, the stratified sampling associated with the stochastic transparency may be optimized by generating one or more opacity reference values associated with the surface data. For example, the one or more opacity reference values associated with the surface data may be generated such that the opacity reference values are evenly spaced. In another example, the one or more opacity reference values associated with the surface data may be stratified both within a pixel as well as between nearby pixels. In yet another example, uncorrelated opacity reference value sequences may be produced. In this way, correlation between surfaces may be avoided.

In addition, in one embodiment, the stratified sampling associated with the stochastic transparency may be optimized by sorting one or more samples of a pixel of the rendered surface. For example, one or more samples of the pixel of the rendered surface may be sorted (e.g., from far to near, from near to far, etc.) according to adept/of each of the surfaces drawn to each sample. In this way, by sorting the samples, previously encountered surfaces may be grouped together, which may ensure that each surface that was previously drawn into the pixel obtains a stratified set of samples when another surface is drawn on top of the previously drawn surfaces.

Further, by sorting the samples, the probability that like surfaces end up in consecutive spans may be increased. In another embodiment, when values have been assigned for a primitive, an order created by the sorting may not be maintained (e.g., may disappear, etc.).

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
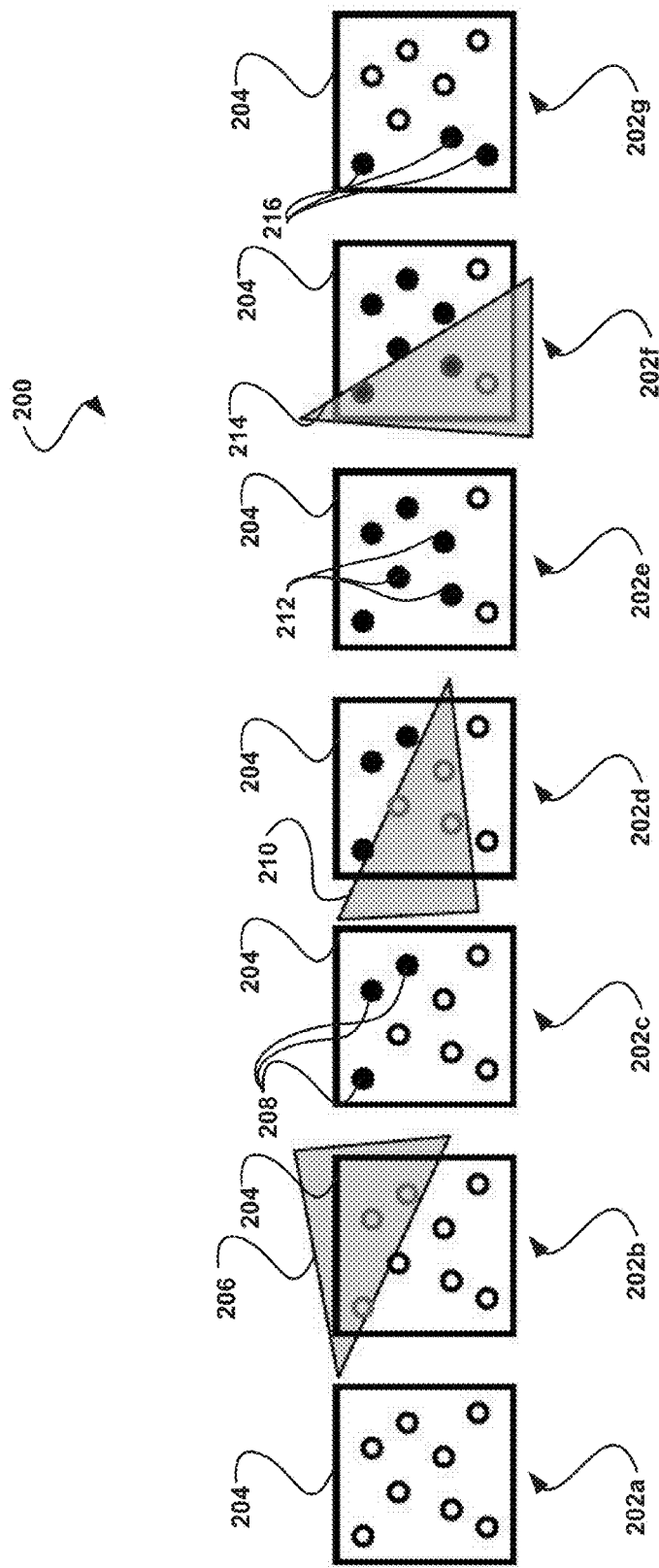
FIG. 2 shows a series of surface changes that are tracked, in accordance with another embodiment.

FIG. 2 shows a series of surface changes 200 that are tracked, in accordance with another embodiment. As an option, the present series 200 may be carried out in the context of the functionality of FIG. 1. Of course, however, the series 200 may, be implemented in any desired environment. It should also be noted that the aforementioned definitions may apply during the present description.

As shown, in a first scenario 202a, a bitmask 204 is initially empty. In one embodiment, the bitmask 204 includes one bit per sample within each pixel. In another embodiment, a surface ID may be maintained per pixel for the bitmask 204, where the surface ID starts at zero. Additionally, in a second scenario 202b subsequent to the first scenario 202a, a first surface primitive triangle 206 arrives without conflicting with the bitmask 204. In one embodiment, when a primitive is drawn into the pixel, a check may be performed to see if any of the samples it covers are set in the bitmask. If not, it may be concluded that the primitive does not overlap with the current surface.

Further, in a third scenario 202c subsequent to the second scenario 202b, bits 208 corresponding to the coverage from the first surface primitive triangle 206 in the second scenario 202b are set within the bitmask 204. In one embodiment, the same surface ID may be kept, and the bits may be set corresponding to the covered samples, effectively augmenting the current surface. In another embodiment, all covered samples that survive the depth test may be examined. In yet another embodiment, the analysis may be performed before performing the opacity test that may cull some of those samples.

Further still, in a fourth scenario 202d subsequent to the third scenario 202e, a second surface primitive triangle 210 of the same surface as the first surface primitive triangle 206 arrives without conflicting with the bitmask 204. Also, in a fifth scenario 202e subsequent to the fourth scenario 202d, bits 212 corresponding to the coverage from the second surface primitive triangle 210 in the fourth scenario 202d are set within the bitmask 204.

In addition, in a sixth scenario 202f subsequent to the fifth scenario 202e, a third surface primitive triangle 214 arrives and conflicts with the bitmask 204. In one embodiment, an opacity reference value sequence may be required that is uncorrelated with the previous surface. Furthermore, in a seventh scenario 202g subsequent to the fifth scenario 202f, the surface ID is increased and the bitmask 204 is initialized to samples 216 covered by the third surface primitive triangle 214 in the sixth scenario 202f.

In one embodiment, if one or more bits corresponding to the covered samples are already set, it may be inferred that the primitive overlaps with the current surface, and therefore needs an uncorrelated set of opacity reference values. In this case a new surface is started, the surface ID is incremented, the bitmask is initialized according to the coverage of the primitive being drawn. In another embodiment, it may be guaranteed that the same samples are not processed twice using the same surface ID.

Figure 3:
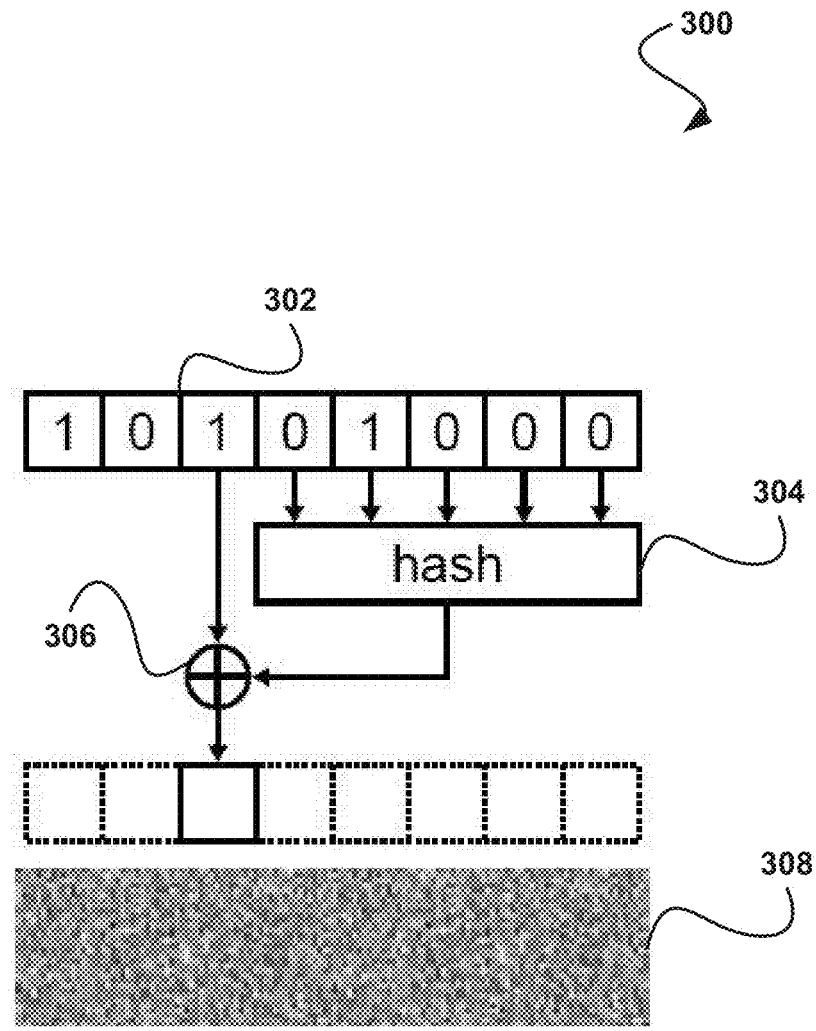
FIG. 3 shows a hash function for generating opacity reference value sequences, in accordance with yet another embodiment.

FIG. 3 shows a hash function 300 for generating opacity reference value sequences, in accordance with another embodiment. As an option, the present hash function 300 may be carried out in the context of the functionality of FIGS. 1-2. Of course, however, the hash function 300 may be implemented in any desired environment. It should also be noted that the aforementioned definitions may apply during the present description.

As shown, each bit of a bit sequence 302 is scrambled based on a hash 304 of the bits below it, utilizing an XOR operation 306. The result 308 illustrates results when eight white surfaces with an opacity of 0.1 are drawn on top of a black background, using eight samples per pixel. In one embodiment, a generic hash function may be employed to provide randomness to the sample. In another embodiment, by conditionally flipping the current bit, improved randomness may be provided into the sequence, which may result in improved stratification when drawing multiple surfaces into the same pixel. In yet another embodiment, each sample may be assigned a reference value, and if an opacity of the surface is greater than the reference value, the surface may be drawn into the sample.

Additionally, in one embodiment, in order to generate opacity reference values on the fly instead of storing them into memory, a function may be needed that maps an integer (e.g., constructed from sample index, pixel index, surface ID, etc.) into a floating-point number (e.g., an opacity reference value, etc.). Furthermore, a continuous span of indices in this sequence may produce a well-stratified sequence of opacity reference values, but disjoint spans may be mutually uncorrelated. In this way, reference values may be evenly spaced, both per pixel and throughout multiple pixels, which may result in a lower amount of noise.

Table 1 illustrates a standard base-2 radical inverse, which may be obtained by reversing the bits of the index and placing a binary point in front. Of course, it should be noted that the calculations shown in Table 1 are set forth for illustrative purposes only, and thus should not be construed as limiting in any manner.

TABLE 1

| Index | Binary | Reversed | Decimal |
|-------|----------|-----------|---------|
| 0 | 00000000 | .00000000 | 0.000 |
| 1 | 00000001 | .10000000 | 0.500 |
| 2 | 00000010 | .01000000 | 0.250 |
| 3 | 00000011 | .11000000 | 0.750 |
| 4 | 00000100 | .00100000 | 0.125 |
| 5 | 00000101 | .10100000 | 0.625 |
| 6 | 00000110 | .01100000 | 0.375 |
| 7 | 00000111 | .11100000 | 0.875 |

In one embodiment, the above sequence may be easy to generate and may allow for a continuous span of indices to produce a well-stratified sequence. In another embodiment, a correlation between disjoint spans may be removed by performing a scrambling operation to the reversed bit sequence. For example, for each bit in the reversed bit sequence, the bits below it are fed into a hash function that returns 0 or 1, and this result is XORed with the bit that is being examined. In this way, the some result may be produced as performing an Owen scramble to the original sequence, and therefore may retains one or more desirable stratification properties. See, for example, "Efficient multidimensional sampling," (Kollig et al., Computer Graphics Forum 21, 3 (2002), 557-564), which is hereby incorporated by reference in its entirety, and which describes methods for performing an Owen scramble.

Additionally, in one embodiment, the operations may be performed in parallel or sequentially, as the potential flips of less significant bits may be thought of being incorporated in the hash function that is in any case random. Table 2 illustrates an example of a scrambled sequence. Of course, it should be noted that the example shown in Table 2 is set forth for illustrative purposes only, and thus should not be construed as limiting in any manner.

TABLE 2

| Index | Reversed | Scrambled | Decimal |
|-------|----------|-----------|---------|
| 0 | 00000000 | 11000000 | 0.750 |
| 1 | 1000000 | 01000000 | 0.250 |
| 2 | 0100000 | 00000000 | 0.000 |
| 3 | 11000000 | 10000000 | 0.500 |
| 4 | 00100000 | 01100000 | 0.375 |
| 5 | 10100000 | 11100000 | 0.875 |
| 6 | 01100000 | 00100000 | 0.125 |
| 7 | 11100000 | 10100000 | 0.625 |

As shown above, for every aligned sequence of length 2, the highest bit of the scrambled index may have both values of 0 and 1, and therefore the values for such spans may be well stratified (e.g., the difference is always 0.5, etc.). Similarly, for aligned sequences of length 4 the two highest bits may get all possible combinations of 00, 01, 10, and 11. In one embodiment, every aligned, continuous sequence with power-of-two length may be perfectly stratified as in the previously considered radical inverse sequence. In another embodiment, disjoint spans may not be correlated anymore, and therefore uncorrelated but internally stratified subsequences may be obtained by jumping into a different place in the sequence.

Further, in one embodiment, computing hashes and XORing the bits may be approximated cheaply by multiplications and word-long XOR operations. In another embodiment, multiplying the index by an even random number may produce a bit string where each input bit may affect all of the bits above it. In another embodiment, XORing that with the index itself may flip each bit based on a hash-like function of the bits below it. In still another embodiment, performing multiple rounds (e.g., four rounds, etc.) with different constants may remove any detectable structure in the results.

Table 3 illustrates an example of pseudocode for opacity reference value calculation using multiplication-based hashing based on a multiply-XOR hash. Of course, it should be noted that the pseudocode shown in Table 3 is set forth for illustrative purposes only, and thus should not be construed as limiting in any manner.

TABLE 3

```
function CalcAlphaRef(sampleId, pixelId, surfaceId)
    1: x ← sampleId + pixelId · samplesPerPixel
    2: x ← reverseBits(x) + surfaceId
    3: x ← x ⊕ (x · 0x6C50B47Cu)
    4: x ← x ⊕ (x · 0xB82F1E52u)
    5: x ← x ⊕ (x · 0xC7AFE638u)
    6: x ← x ⊕ (x · 0x8D22F6E6u)
    7: return x scaled to range [0, 1]
```

In one embodiment, the variable "x" shown in Table 3 may include an integer (e.g., a 32-bit unsigned integer, etc.). In another embodiment, the multiplication constants may be used in generating the images. In yet another embodiment, to obtain perfect stratification among the samples in a pixel, the sample index may be placed into the lowest hits of the index, and for spatial stratification (e.g., dithering, etc.), the pixel index may be placed right above it. In still another embodiment, a pixel index may be determined so that nearby pixels have nearby indices.

Further still, in one embodiment, a Hilbert curve may be used when generating images. In this way, improved results that have no apparent structures may be produced. In another embodiment, the surface index may be placed in the lowest bits of the reversed bit sequence, (i.e., the highest bits of the index). This may ensure that whenever there is a change of surface, a completely new part of the sequence is jumped to and values that are uncorrelated with previously generated values are obtained.

Figure 4:
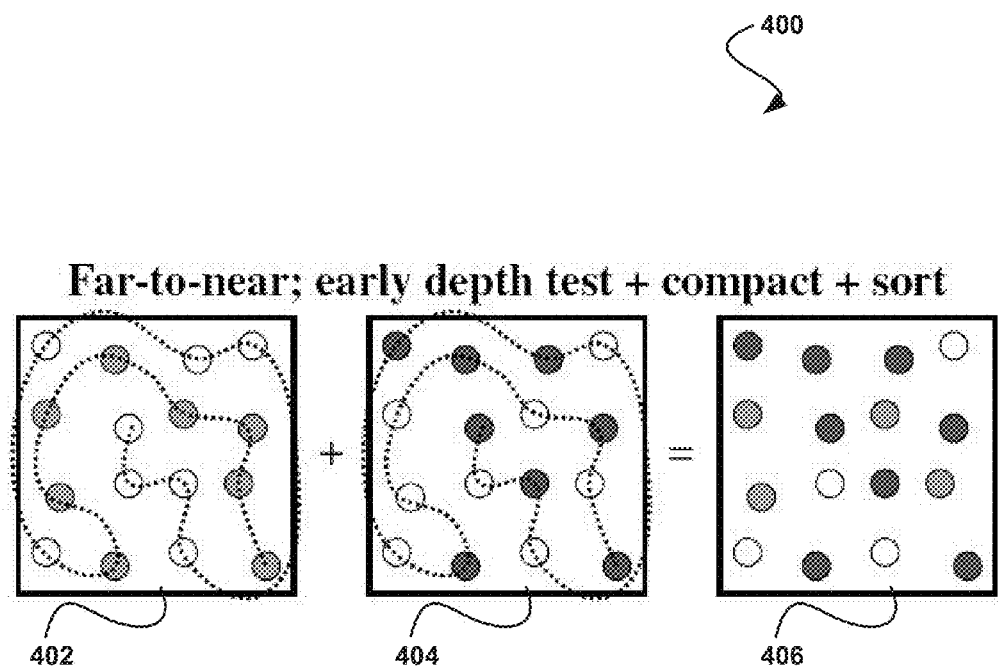
FIG. 4 shows a scenario in which one or more samples of each pixel of a rendered surface are sorted, in accordance with yet another embodiment.

FIG. 4 shows a scenario 400 in which one or more samples of each pixel of a rendered surface are sorted, in accordance with another embodiment. As an option, the present scenario 400 may be carried out in the context of the functionality of FIGS. 1-3. Of course, however, the scenario 400 may be implemented in any desired environment. It should also be noted that the aforementioned definitions may apply during the present description.

As shown, the samples of the far surface 402 and the near surface 404 are sorted, according to a depth of previously drawn surfaces. This results in a correctly stratified result 406. In one embodiment, the later drawn, occluding surface may be made to cover exactly half of each previously drawn surface. In another embodiment, this may be accomplished by sorting the samples before assigning them indices. For example, the previous depth values stored in the depth buffer at each of the covered samples may be retrieved. Additionally, the samples may be sorted in increasing order based on these depths. This may group the surfaces in the pixel together and may ensure that each previously drawn surface gets a continuous span of indices from the opacity reference value sequence, which may ensure good stratification.

Additionally, in one embodiment, there may be no need to detect individual surfaces, and groups of surfaces (e.g. distant foliage, etc.) may be stratified as a whole. In this way, sorting the samples may be used instead of trying to group the samples into discrete surfaces. In another embodiment, a number of bits set in the current surface coverage bitmask used for detecting surface changes may be counted in order to determine how many samples have been drawn from the current surface, and the numbering of samples may be continued from there. In yet another embodiment, in case of starting a new surface after a conflict, counting is started from zero. For example, after values are assigned for a particular primitive, the ordering of the samples may disappear.

Figure 5:
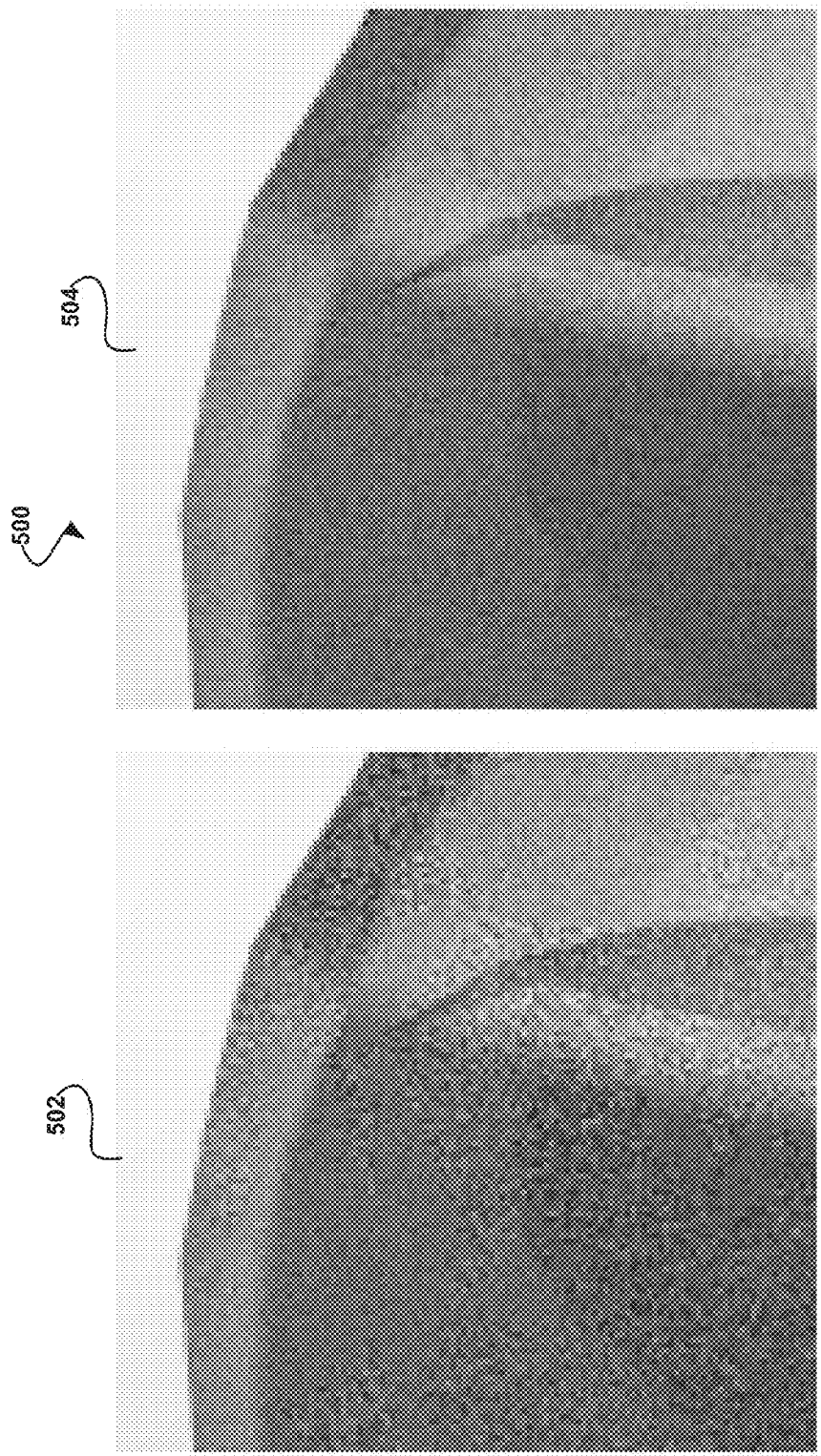
FIG. 5 illustrates the effect of sorting when drawing a cloth model that has multiple transparent layers and triangles ordered randomly, in accordance with yet another embodiment.

FIG. 5 illustrates the effect 500 of sorting when drawing a cloth model that has multiple transparent layers and triangles ordered randomly, in accordance with one embodiment. Result 502 illustrates regions of high and low amount of noise. In one embodiment, in places where the near surface is drawn first, the compaction of samples may be enough to guarantee that the far surface gets the correct number of samples, and hence low amount of noise. When the far surface is drawn first, there may be no guarantee of it having the correct number of samples after the near surface is drawn over it. In this way, these regions may exhibit a high amount of noise. Result 504 illustrates the result in another embodiment when the samples are sorted, such that all parts of the image may have the same low amount of noise (e.g., a more uniform low noise level.

Table 4 illustrates an example of pseudocode for a stratified stochastic transparency algorithm. Of course, it should be noted that the pseudocode shown in Table 4 is set forth for illustrative purposes only, and thus should not be construed as limiting in any manner.

TABLE 4

```
procedure DrawFragment(pixel p, samples S)
  1: for each sample s ∈ S do
  2:   if s.z > p.depth[s.sampleId] then remove s from S
  3: end for
  4: if for any s ∈ S bit p.covered[s.sampleId] is set then
  5:   p.surfaceId ← p.surfaceId + 1
  6:   clear p.covered
  7: end if
  8: n ← number of set bits in p.covered
  9: sort S in order of increasing p.depth[s.sampleId]
 10: for each sample s ∈ S do
 11:   ref ← CalcAlphaRef(n, p.pixelId, p.surfaceId)
 12:   if s.opacity > ref then
 13:     p.depth[s.sampleId] ← s.z
 14:     p.color[s.sampleId] ← s.color
 15:   end if
 16:   n ← n + 1
 17: end for
 18: for each s ∈ S do set p.covered[s.sampleId]
```

In one embodiment, set S may contain the samples of the fragment being drawn. Additionally, lines 1-3 may perform depth test and lines 4-7 and 18 may track the current surface. Lines 8-11 and 16 may ensure correct ordering of opacity reference values, and lines 12-15 may perform the opacity test and conditional write. In another embodiment, on line 9 the samples of the fragment may be sorted according to previously drawn depths at the covered sample positions, and not the depths of the samples in the fragment being drawn.

Figure 6:
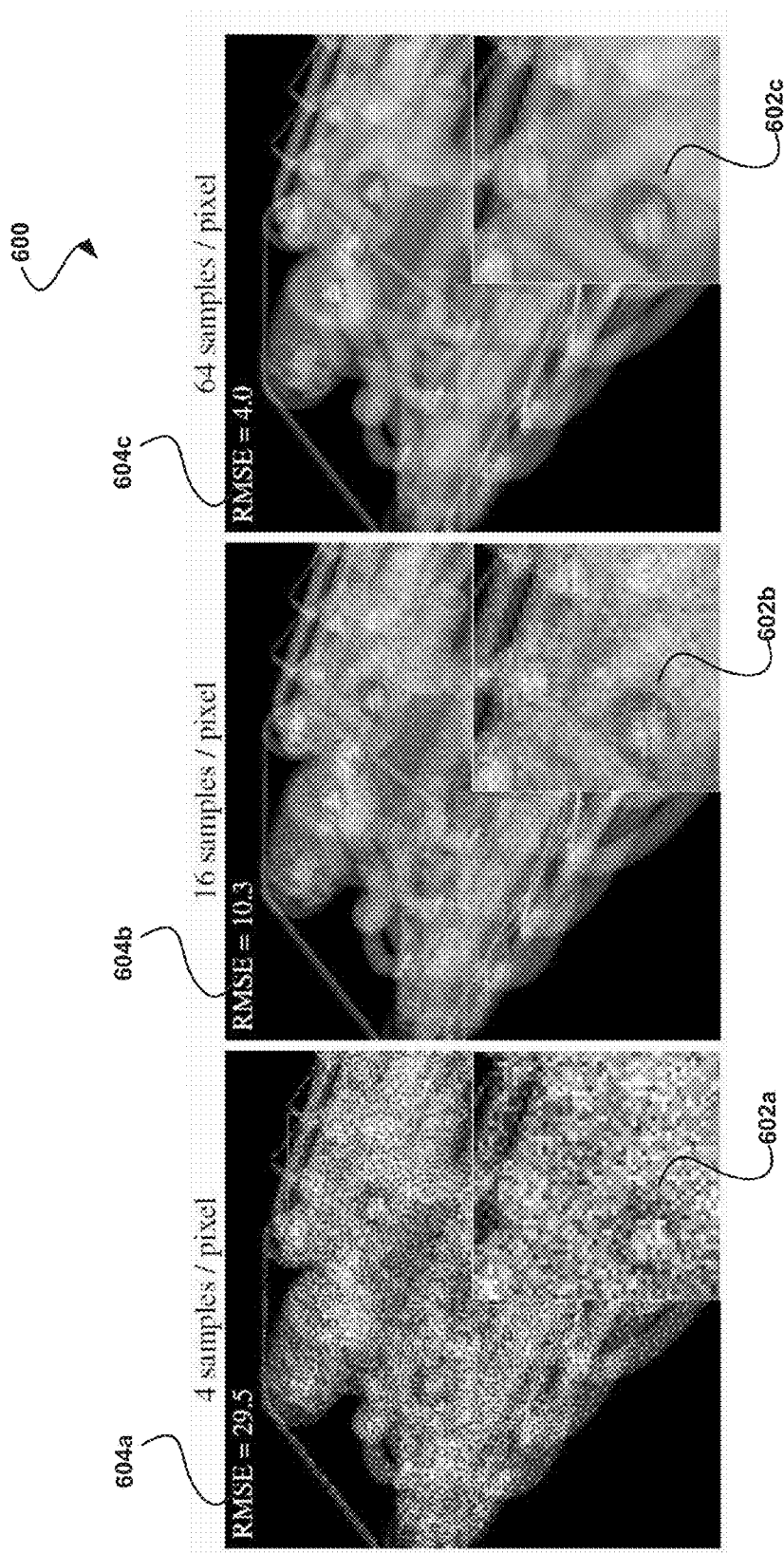
FIG. 6 shows results using an optimized stratified sampling method in a case of a multi-layered, complex model, in accordance with yet another embodiment.

Additionally, in one embodiment, the above algorithm may be implemented in hardware. Of course, however, the algorithm may also be implemented in software, a combination of hardware and software, etc. FIG. 6 shows results 600 using an optimized stratified sampling method in a case of a multi-layered, complex model, in accordance with one embodiment. In this way, the effectiveness of the optimized method may be seen in both image quality 602*a-c* and root mean squared error (RMSE) values 604*a-c* computed against a reference image rendered using thousands of samples per pixel.

Further, in yet another embodiment, the RMSE values may fall faster when a number of samples is increased, which may indicate better stratification. In this way, significant memory, computation and bandwidth savings may be produced. In another embodiment, one or more multi-pass methods may be combined with the aforementioned stratification algorithm, and may further improve image quality. See, for example, "Stochastic transparency," (Enderton et al., In *Proceedings of the ACM Symposium on Interactive* 3*D Graphics and Games* (2010), pp. 157-164), which is hereby incorporated by reference in its entirety, and which describes various multipass methods.

Table 5 illustrates results of tests cases utilizing a stratified stochastic transparency algorithm compared against a comparison method. Of course, it should be noted that the results shown in Table 5 are set forth for illustrative purposes only, and thus should not be construed as limiting in any manner.

TABLE 5

| spp | MOTOR | | | CLOTH | | |
|---|---|---|---|---|---|---|
| | our | comp. | ratio | our | comp. | ratio |
| 4 | 29.5 | 36.3 | 0.81 | 17.0 | 19.3 | 0.88 |
| 8 | 17.9 | 25.3 | 0.71 | 9.7 | 12.3 | 0.79 |
| 16 | 10.3 | 17.2 | 0.60 | 5.6 | 8.4 | 0.67 |
| 32 | 6.3 | 12.1 | 0.52 | 3.3 | 5.8 | 0.57 |
| 64 | 4.0 | 8.7 | 0.46 | 2.0 | 4.1 | 0.49 |

As shown in Table 5, as the number of samples per pixel grows, the RMSE for the stratified stochastic transparency algorithm (e.g., column "our") may improve faster than with the comparison method (e.g., column "comp."), which may indicate improved stratification. In one embodiment, at 64 samples per pixel, the stratified stochastic transparency algorithm may approximately halve a magnitude of noise compared to the comparison method.

Further, in one embodiment, the first image being rendered may be progressively refined (e.g., using a fixed number of samples, etc.) by rendering a second image with different stratification patterns. Additionally, the first and second images may be averaged, which may result in less noise. In another embodiment, additional images may be rendered and averaged multiple times, which may result in stratification between the different images and a faster drop in noise based on the stratification.

Further still, in one embodiment, stochastic transparency may operate in a fixed amount of storage and may produce a result with the correct expected value. In another embodiment, an amount of variance in the results may depends on the sampling strategy used. For example, stratifying samples in appropriate domains may bound the amount of sampling error in simple situations, and may yield overall better sampling in complex situations. In another example, techniques may be used for obtaining properly stratified sampling in both spatial and alpha domains, which may reduce an amount of noise in the resulting image.

Also, in another embodiment, a basic stochastic transparency algorithm may perform the following computation for every covered sample: 1. Perform depth test, discard if failed; 2. Randomly choose an opacity reference value x: [0,1]; 3. If a>x, write sample to frame buffer and depth buffer. This method may yield the correct expected value for a pixel. In still another embodiment, each sample of the pixel may be assigned an opacity reference value that may be used in place of randomly chosen opacity reference value x. In another embodiment, it may not be first decided how many samples are desired to be covered, but instead opacity reference values may be generated so that the desired stratification may be obtained. This may produce significantly less noise while remaining unbiased. Additionally, see, for example, "Pixel Masks for Screen-Door Transparency," (Mulder et al.), which is hereby incorporated by reference in its entirety, and which describes methods for pixel masks for screen door transparency.

Further, in one embodiment, opacity reference values may not be statically assigned to the samples. In another embodiment, if the surface is drawn in several parts into the same pixel, (e.g., there is an edge inside the pixel, etc.) the assignment may remain consistent. This may ensure stratification across the entire surface in the pixel instead of only within each individual fragment.

Further still, in one embodiment, for a single surface, the assignment may remain static, whereas for different surfaces it may be uncorrelated with previously drawn surfaces. This may require detecting when a new surface is started, which may allows for reassigning the opacity reference values. In another embodiment, a heuristic method may automatically detect this situation. In yet another embodiment, there may be several requirements for the opacity reference values. First, they may need to be stratified within the pixel, and secondly, between nearby pixels. The latter may ensure high quality dithering instead of random noise. Thirdly, to support multiple surfaces, it may be possible to produce uncorrelated opacity reference value sequences without sacrificing the first two properties. In another embodiment, a suitable random number sequence may be provided that is easy to generate.

Additionally, in one embodiment, the existing samples may be sorted, which may effectively group previously encountered surfaces together, which may ensure that each surface that was previously drawn into the pixel obtains a stratified set of samples when a surface is drawn on top of them. In this way, noise may be properly dithered, edge artifacts may be avoided, and stratification may be improved and maintained for multiple layers. Additionally, stochastic transparency may be improved such that stratified sampling may be enabled in both spatial and alpha domains, which may result in a reduction of the amount of noise in an image while maintaining an unbiased result.

Figure 7:
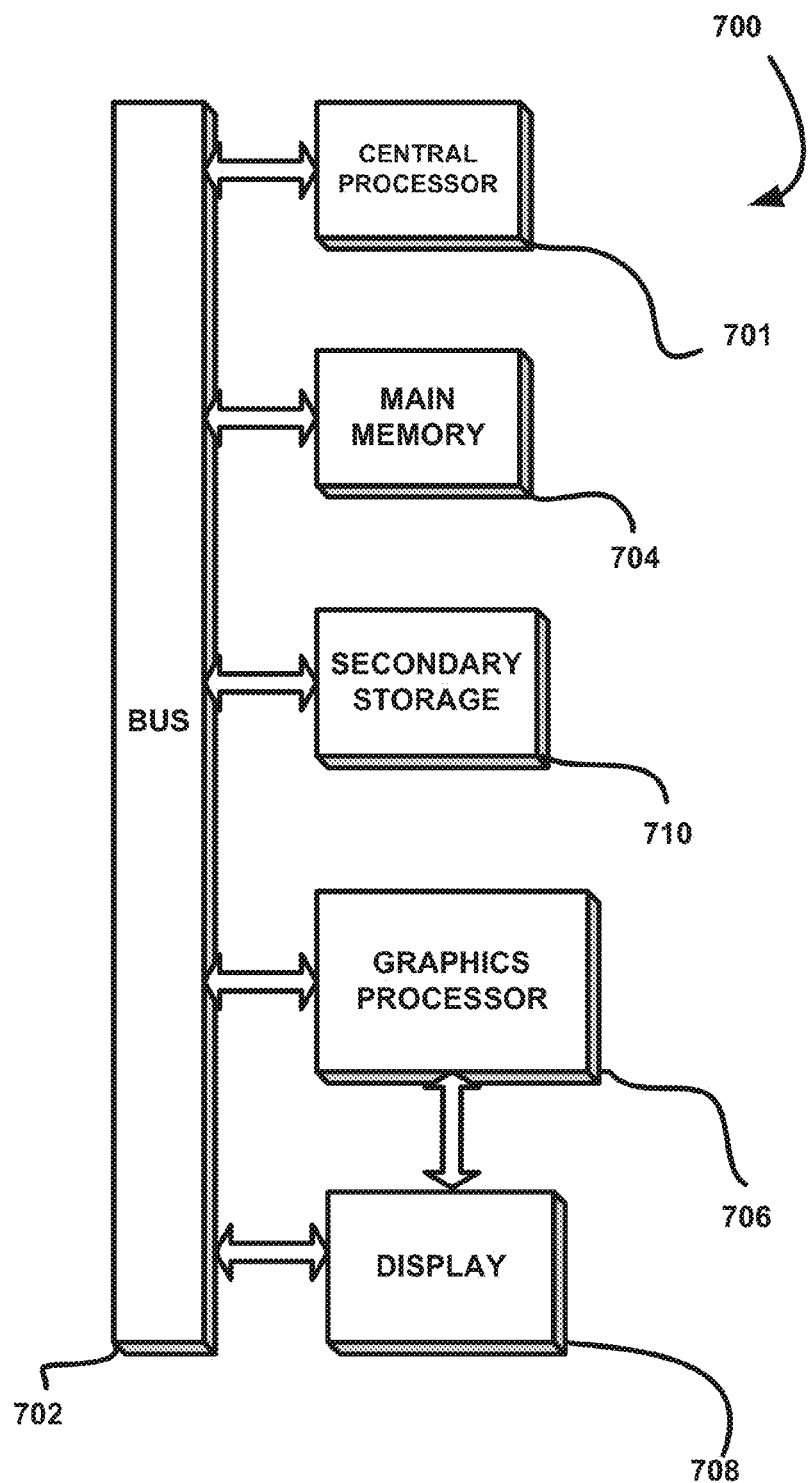
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one host processor 701 which is connected to a communication bus 702. The system 700 also includes a main memory 704. Control logic (software) and data are stored in the main memory 704 which may take the form of random access memory (RAM).

The system 700 also includes a graphics processor 706 and a display 708, i.e. a computer monitor. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704 and/or the secondary storage 710. Such computer programs, when executed, enable the system 700 to perform various functions. Memory 704, storage 710 and/or any other storage are possible examples of computer-readable media.

In one embodiment, the architecture and/or functionality of the various previous figures may be implemented in the context of the host processor 701, graphics processor 706, an integrated circuit (not shown) that is capable of at least a portion of the capabilities of both the host processor 701 and the graphics processor 706, a chipset a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, lap-top computer, and/or any other type of logic. Still yet, the system 700 may take the form of various other devices m including, but not limited to a personal digital assistant (PDA) device, a mobile phone device, a television, etc.

Further, while not shown, the system 700 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving an opacity for each of one or more surfaces at a pixel to be rendered;
identifying a plurality of samples within the pixel;
assigning an opacity reference value to each of the samples within the pixel that is covered by the one or more surfaces; and
for each of the covered samples of the pixel, conditionally rendering each of the one or more surfaces at the sample, utilizing stochastic transparency, by:
comparing the opacity of the surface to the opacity reference value assigned to the sample covered by the surface,
when it is determined based on the comparison that the opacity of the surface is greater than the opacity reference value assigned to the sample, then drawing the surface into the sample, and
when it is determined based on the comparison that the opacity of the surface is not greater than the opacity reference value assigned to the sample, then avoiding drawing the surface into the sample;
wherein stratified sampling associated with the stochastic transparency is optimized by assigning a new opacity reference value to each of the plurality of samples of the pixel each time a new surface covering the sample is detected within the pixel.

2. The method of claim 1, wherein one or more of the surfaces has a level of transparency.

3. The method of claim 1, wherein stochastic transparency is utilized to render the one or more surfaces by performing a depth test on every covered sample of the pixel to be rendered.

4. The method of claim 1, wherein each covered sample is conditionally written to a frame buffer and depth buffer, based on a comparison of an opacity of each covered sample to the opacity reference value.

5. The method of claim 1, wherein the stratified sampling associated with the stochastic transparency is optimized by tracking the one or more surface.

6. The method of claim 5, wherein the tracking is performed heuristically.

7. The method of claim 1, wherein the one or more opacity reference values are generated such that the opacity reference values are evenly spaced.

8. The method of claim 1, wherein the one or more opacity reference values are stratified both within the pixel to be rendered as well as between nearby pixels.

9. The method of claim 1, wherein the stratified sampling associated with the stochastic transparency is optimized by sorting one or more samples of a pixel of one or more rendered surfaces.

10. The method of claim 9, wherein the one or more samples of the pixel of the one or more rendered surfaces are sorted, according to a depth of each of the surfaces previously drawn to each sample.

11. The method of claim 9, wherein by sorting the one or more samples, previously encountered surfaces are grouped together, which ensures that each surface that was previously drawn into the pixel obtains a stratified set of samples when another surface is drawn on top of previously drawn surfaces.

12. The method of claim 1, wherein the new surface covering the sample is detected within the pixel to be rendered when it is determined that the new surface covers one or more samples of the pixel that are set in a bitmask associated with the pixel.

13. The method of claim 12, wherein samples set in the bitmask associated with the pixel indicate samples that are covered by a previous surface.

14. The method of claim 1, wherein the opacity reference values are generated by:
   identifying a continuous span of indices,
   converting each index of the continuous span of indices into a binary formatted index, and
   reversing each binary formatted index and placing a binary point in front to generate a different reversed bit sequence for each index of the continuous span of indices.

15. The method of claim 14, wherein a scrambling operation is performed on each reversed bit sequence of the reversed bit sequences by:
   for each bit in the reversed bit sequence:
     performing a hash function on bits below the bit,
     receiving one of a first value and a second value from the hash function, and
     performing an XOR operation on the one of a first value and a second value with the bit.

16. A computer program product embodied on a non-transitory computer readable medium, comprising:
   code for receiving an opacity for each of one or more surfaces at a pixel to be rendered;
   code for identifying a plurality of samples within the pixel;
   code for assigning an opacity reference value to each of the samples within the pixel that is covered by the one or more surfaces; and
   code for, for each of the covered samples of the pixel, conditionally rendering each of the one or more surfaces at the sample, utilizing stochastic transparency, by:
     comparing the opacity of the surface to the opacity reference value assigned to the sample covered by the surface,
     when it is determined based on the comparison that the opacity of the surface is greater than the opacity reference value assigned to the sample, then drawing the surface into the sample, and
     when it is determined based on the comparison that the opacity of the surface is not greater than the opacity reference value assigned to the sample, then avoiding drawing the surface into the sample;
   wherein stratified sampling associated with the stochastic transparency is optimized by assigning a new opacity reference value to each of the plurality of samples of the pixel each time a new surface covering the sample is detected within the pixel.

17. A system, comprising:
   hardware for:
     receiving an opacity for each of one or more surfaces at a pixel to be rendered,
     identifying a plurality of samples within the pixel,
     assigning an opacity reference value to each of the samples within the pixel that is covered by the one or more surfaces, and
     for each of the covered samples of the pixel, conditionally rendering each of the one or more surfaces at the sample, utilizing stochastic transparency, by:
       comparing the opacity of the surface to the opacity reference value assigned to the sample covered by the surface,
       when it is determined based on the comparison that the opacity of the surface is greater than the opacity reference value assigned to the sample, then drawing the surface into the sample, and
       when it is determined based on the comparison that the opacity of the surface is not greater than the opacity reference value assigned to the sample, then avoiding drawing the surface into the sample;
   wherein stratified sampling associated with the stochastic transparency is optimized by assigning a new opacity reference value to each of the plurality of samples of the pixel each time a new surface covering the sample is detected within the pixel.

18. The system of claim 17, further comprising memory coupled to the hardware via a bus.

* * * * *